United States Patent [19]
Wetmore

[11] 3,809,882
[45] May 7, 1974

[54] LIGHTING DEVICE
[75] Inventor: Harold B. Wetmore, Needham, Mass.
[73] Assignee: Unique Devices Engineering & Consulting Corp., Waltham, Mass.
[22] Filed: Jan. 20, 1971
[21] Appl. No.: 107,960

[52] U.S. Cl. 240/10.6 CH, 240/10.66, 240/51.11 R
[51] Int. Cl. F21l 9/00, F21l 15/08
[58] Field of Search 240/10.6 F, 10.6 CH, 10.66, 240/11.4 R, 51.11 R, 11.4 H, 10.6 R, 6.4 R

[56] References Cited
UNITED STATES PATENTS

| | | | |
|---|---|---|---|
| 2,413,599 | 12/1946 | Beck | 240/51.11 X |
| 3,604,920 | 9/1971 | Niles | 240/10.6 R |
| 3,435,206 | 3/1969 | Swanson | 240/11.4 R |
| 2,336,750 | 12/1943 | Roney et al. | 240/10.6 F |
| R25,388 | 5/1963 | Moore | 240/10.6 CH |
| 3,249,749 | 5/1966 | Haas | 240/11.4 R |

OTHER PUBLICATIONS
Publ. IES Lighting Hndbk. 4th Ed. by Illuminating Engr. Society. TK 4161 I45 (1966) CZ (Gp 210) pp. 8-14 to 8-17, 8-23 to 8-29.

*Primary Examiner*—Richard C. Queisser
*Assistant Examiner*—Daniel M. Yasich

[57] ABSTRACT

The device is portable, may be comfortably held in the hand, and employs a screw-in fluorescent light source that is powered from one or more conventional rechargeable batteries through a drive circuit. The batteries and drive circuit are housed within the device and a slide switch or the like on the device is actuable to electrically connect and disconnect the batteries to the drive circuit. The fluorescent source has a protective tube extending thereabout. The device also includes a base upon which the device normally rests. Two receptacles are provided in the base for receiving an AC and DC plug for the purpose of recharging the batteries, respectively, from a conventional AC outlet or from an automobile battery, for example. A second slide switch is provided on the base for selecting either a "charge/on" condition or an "off" condition.

12 Claims, 9 Drawing Figures

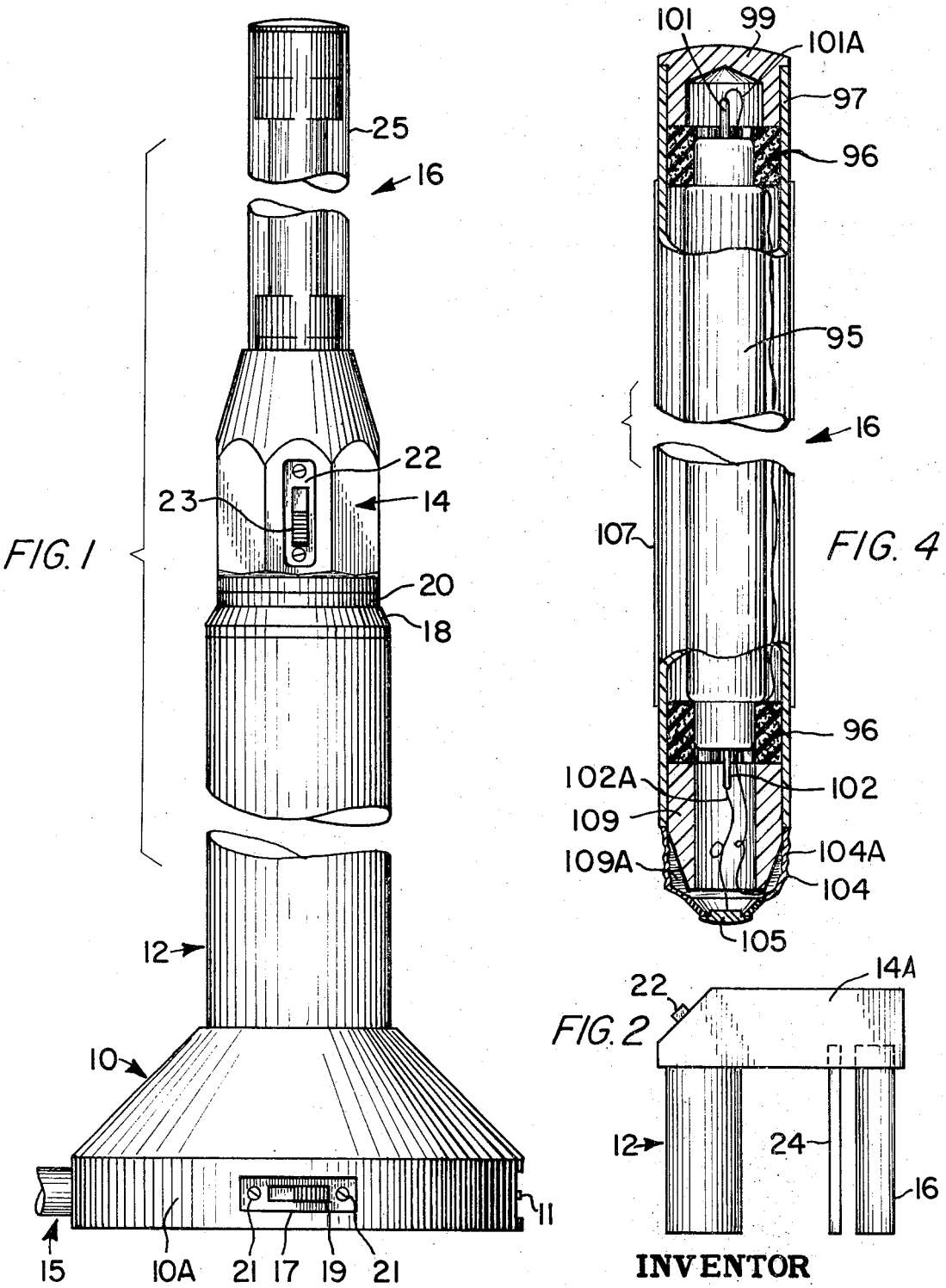

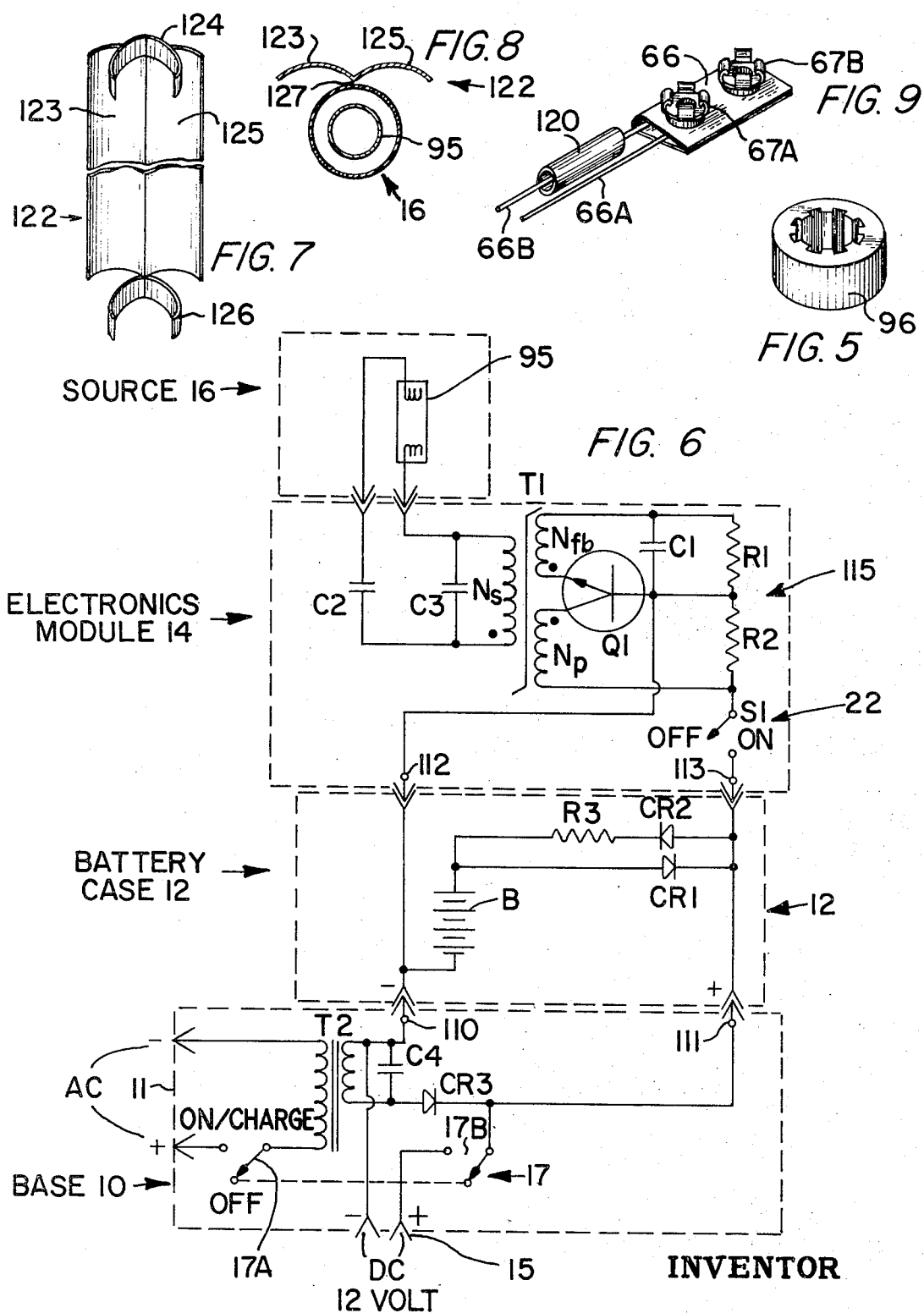

LIGHTING DEVICE

FIELD OF THE INVENTION

The present invention relates in general to lighting devices that may be used as a portable flashlight or as a stationary light source such as a lamp. More particularly, the present invention is concerned with a lighting device that preferably employs a screw-in fluorescent light source that is powered from one or more rechargeable batteries through a drive circuit. The device includes means for receiving an AC and DC plug for the purpose of recharging the batteries from a conventional AC outlet, for example, or from an automobile battery, for example, respectively.

BACKGROUND OF THE INVENTION

Most of the flashlights presently available employ incandescent bulbs which are powered by one or more replaceable drycell batteries. One of the problems associated with these devices is that the batteries, which are usually not rechargeable have to be periodically replaced particularly when the device is operated quite often or when subjected to low temperatures over an extended period, whether operated or not. Also, the incandescent bulb requires excessive power to be operated at a suitable light output level.

Furthermore, the known flashlights, using a low power drain source such as a fluorescent light source, are cumbersome, do not provide means for readily recharging the batteries of the device and are not designed to be easily adapted for different size fluorescent sources and/or different energy capacity battery packs. Also, these known devices are not durable, explosion-proof and waterproof, and do not provide good light directivity from the light source.

OBJECTIVES OF THE INVENTION

Accordingly, a primary objective of the present invention is to provide an improved rechargeable lighting device that employs a screw-in fluorescent light source powered from drive circuitry, one or more batteries and means for enabling recharging of the batteries.

Another objective of the present invention is to provide a lighting device in accordance with the primary objective that is portable, may be comfortably held in the hand, and may also be used as a stationary source of light, such as a lamp, pluggable into either an AC or DC source of power.

A further objective of the present invention is to provide a lighting device in accordance with the primary objective that is relatively compact yet is able to provide appreciably more light output than devices using an incandescent-type lamp.

Still another objective of the present invention is to provide a lighting device in accordance with the primary objective that is readily adapted for use with different energy capacity batteries, is durably constructed and is waterproof.

SUMMARY OF THE INVENTION

The light source of the present invention may be used as a portable flashlight, or as a stationary lamp, for example, and is adapted to contain batteries, rechargeable from either an AC or a DC source. The device of this invention comprises a base upon which the device normally rests, a battery case coupled to the base for containing one or more rechargeable batteries, and an electronics module coupled to the battery case and containing drive circuitry. A pair of receptacles are provided in the base for receiving AC and DC plugs for the purpose of recharging the batteries from a conventional AC outlet or from a car battery, for example, respectively. A pair of conductor wires couple the terminals of the battery or batteries, via an ON/OFF switch to the drive circuitry. The switch is actuable to energize or deenergize the fluorescent light source which is threadedly insertable into the electronics module and may be energized by the drive circuitry contained in the electronics module. For accommodating the fluorescent source the electronics module contains a threaded lamp socket for conductively receiving a mating threaded insert of the fluorescent light source.

In accordance with one aspect of the present invention, the electronics module is threadedly detachable from the top end of the battery case and the base is, in turn, threadedly detachable from the bottom end of the battery case. In this way different battery cases containing different capacity batteries may be readily substituted in the device. In one device constructed in accordance with the invention, a charging resistor is coupled in series with the battery pack. For larger energy capacity batteries a quicker charging rate is desired and thus the charging resistor has a smaller value than if a smaller capacity battery pack were used.

In accordance with another aspect of the present invention the fluorescent light source is supported at its end by resilient annular members and is housed within a clear, hard plastic tube. This arrangement provides a waterproof and shock-proof source as discussed in more detail hereafter.

In accordance with still another aspect of the present invention the protective plastic tube of the light source has a reflective coating applied to a portion of a surface thereof to reflect light from the source and thus provide directivity of the light emitted from the fluorescent source. In this connection a reflective type tape may be merely stuck to the outer surface of the protective tube. Alternatively, a clip-on metallic reflector may also be clipped to the protective tube at the desired location to provide directivity of the light source in the desired direction.

BRIEF DESCRIPTION OF THE DRAWINGS

The invention, both as to its construction and mode of use, can be beter understood from the following exposition when considered in conjunction with the accompanying drawings in which:

FIG. 1 is a front view of a lighting device constructed in accordance with the principles of the present invention;

FIG. 2 shows another lighting device constructed in accordance with the principles of the present invention, and having a bridge-shaped configuration;

FIG. 4 is a partial cross-sectional view of the fluorescent light source of FIG. 1;

FIG. 5 is a perspective view of the annular tube seat shown in FIG. 4;

FIG. 6 is a schematic diagram illustrating the circuitry contained within the electronics module, battery case and base, and the location of the switches and receptacles used in the electronics module and base;

FIG. 7 illustrates a metallic clip-on reflector that may be used with the device of FIG. 1;

FIG. 8 is a top view of the clip-on reflector of FIG. 7 fastened to the light source; and FIG. 9 is a perspective view of a contact clip used in the battery case, and shown in FIG. 3.

EXPOSITION

Figure 3:
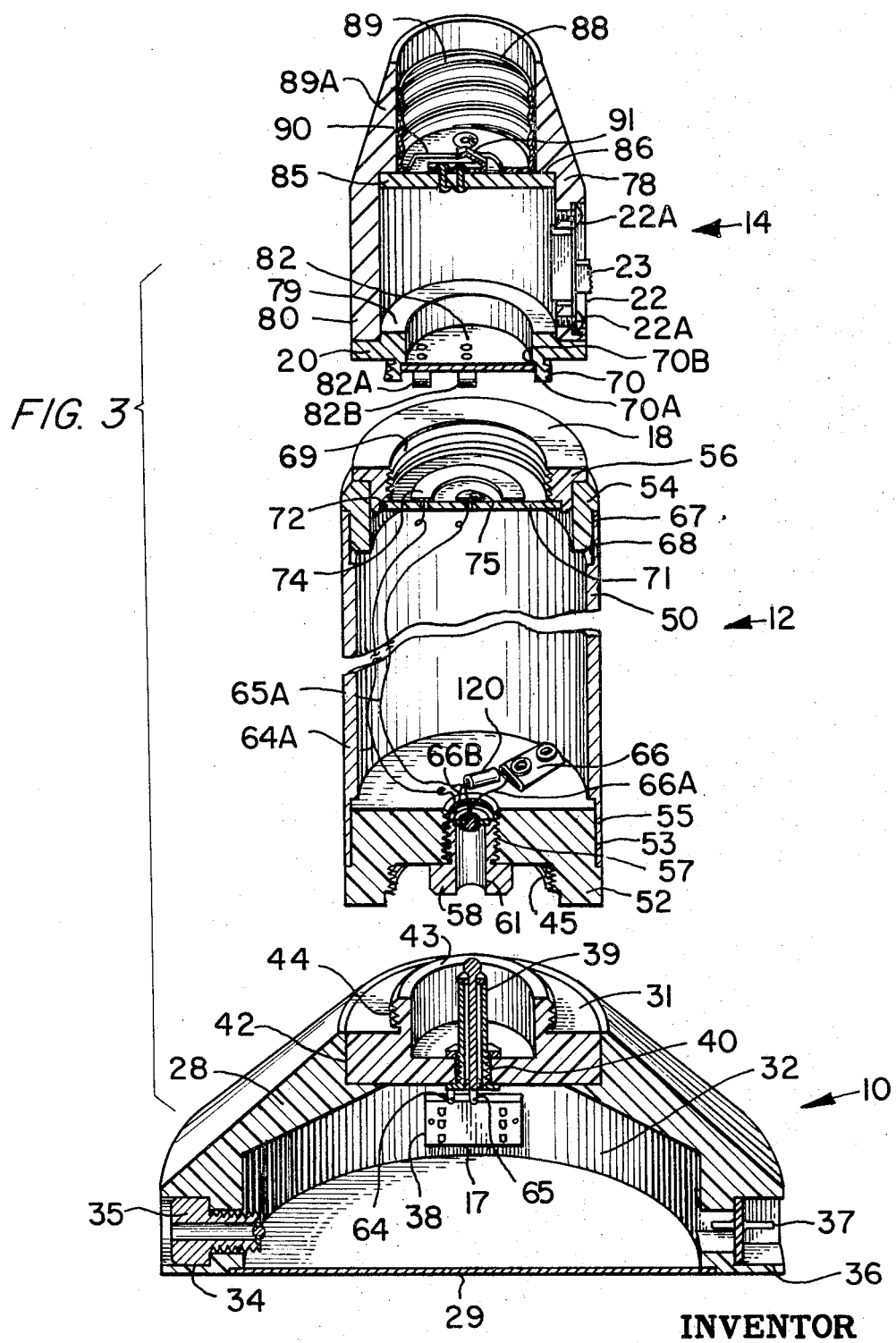
FIG. 3 is an exploded cross-sectional perspective view of the device of FIG. 1 illustrating the base, battery case and electronics module.

Referring now to FIG. 1 there is shown a preferred embodiment of a lighting device constructed in accordance with the principles of the present invention. The lighting device comprises a base 10, a battery case 12, an electronics module 14, and a fluorescent light source 16. The base 10 may be molded plastic, has a generally frustoconic shape and includes an AC receptacle 11 and a DC receptacle 15 for receiving an AC and a DC plug, respectively. A slide switch 17 is arranged with its sliding member 19 extending outwardly from the base and in easy access for an operator of the device. The switch 17 is suitably secured to base 10 such as by screws 21. In the embodiment shown both receptacles and the slide switch are located about the annular surface 10A of base 10. The internal wiring to the receptacles 11 and 15 and to the slide switch 17 is discussed in more detail hereafter with reference to the schematic diagram of FIG. 6.

The battery case 12 may be constructed of a thin cylindrical aluminum or steel tube which is preferably covered by an adhesive decorative material such as a wood-grained commercial contact paper. The top section of the battery case 12 includes a battery case cap 18 having an internally threaded portion which mates with the module adapter 20 of electronics module 14. The module adapter 20 and battery case cap 18 may be threadedly engaged and disengaged. Similarly, the base and battery case are threadedly detachable from each other, as shown in FIG. 3 so that different capacity battery cases may be used with the device.

The electronics module 14 has a second slide switch 22 including a sliding member 23 extending from the surface of module 14 and in easy access for an operator of the device. This slide switch couples or uncouples the energy from the battery to the drive circuitry contained within the electronics module 14, which circuitry is discussed hereafter with reference to FIG. 6.

The fluorescent light source 16 is threadedly engaged into a receiving socket of the electronics module 14, and includes an outer clear plastic protective tube 25. The source 16 is shown in more detail in FIG. 4 while the receiving socket is shown in FIG. 3.

Referring now to FIG. 2 there is shown another configuration for a lighting device constructed according to the principles of this invention. This device includes a battery case 12 that may be supported on a base (not shown). A horizontally extending electronics module 14A is threadedly coupled to the battery case 12 and includes a slide switch 22 for operating the fluorescent light source 16. In FIG. 2 a reflector 24 is also shown positioned intermediate the battery case 12 and the fluorescent source 16 for the purpose of reflecting light away from the battery case 12. Reflector 24 may be inserted in a recess provided in electronics module 14A, or may clip about source 16.

Referring now to FIG. 3 there is shown an exploded perspective view in cross-section of the base 10, the battery case 12 and the electronics module 14. In order to simplify the drawings of FIG. 3 most of the circuitry contained in the device including the battery is now shown. The base 10 basically includes a frustoconical base member 28, a circular bottom plate 29 and a base adapter 31 which together define a chamber 32. As indicated in FIG. 6 a transformer T2 is contained within this chamber 32 along with diode CR3, capacitor C4 and a portion of switch 17. The frustoconic base member 28 also includes three apertures in surface 10A. Apertures 34 and 36 contain conventional DC and AC receptacles 35 and 37, respectively. An elongated rectangular aperture 38 is also provided in member 28 for accommodating slide switch 17 which is a double pole/single throw switch.

As indicated in FIG. 6 two connections couple from base 10 by way of a fixed plug 39, shown in FIG. 3, to battery case 12. Plug 39 may be a conventional phone plug that is adapted to be threadedly engaged within a threaded recess 40 of base adapter 31. Plug 39 includes solder contacts 64 and 65 to which the circuitry in chamber 32 connects. Plug 39 includes conventional inner and outer conductor portions that connect with inner and outer conductor portions of receptacle 58. Terminals 110 and 111 in FIG. 6 represent these conductors. The member 28 is provided with a cylindrical aperture 42 within which the adapter 31 snuggly fits. A suitable bonding glue may be used to secure adapter 31 in aperture 42 of member 28. The adapter 31 includes an integral flange 43 extending upwardly and having an outwardly threaded portion 44 which mates with an inwardly threaded portion 45 of battery case 12. The base adapter 31 may be constructed of a plastic material pre-formed to the shape indicated in FIG. 3.

Transformer T2 (see FIG. 6) may be secured in chamber 32 in any suitable manner. It could be attached to the upper surface of plate 29. Alternatively, the components in base 10 including transformer T2 could be suitably positioned and an epoxy potting compound could fill the chamber 32 to provide a heavier base 10 with encapsulated components.

The battery case 12 includes a cylindrical handle 50, a battery case 52, a battery case adapter 54, and a battery case cap 18. The battery case base 52 is notched at 53 and fits within the bottom portion 55 of handle 50. There may be a force fit between base 52 and handle 50, and the base 52 may be detachable from the handle in order to replace the batteries in the handle. The base 52 is provided with inner threads 45 and also includes a threaded aperture 57 for accommodating a conventional receptacle 58. When the battery case base 52 is threadedly engaged with the base adapter 31 the plug 39 fits within the aperture 61 of receptacle 58 and the contacts 64 and 65 of receptacle 40 are in electrical contact with the wires 64A and 65A, respectively. Thus, receptacle 58 and plug 39 together comprise a connector means. These wires 64A and 65A may be attached to the appropriate terminals of receptacle 58 by soldering, for instance. Battery clip 66 is also soldered via leads 66A and 66B to the appropriate terminals of receptacle 58. Clip 66 is shown in FIG. 9 and discussed in more detail hereafter. Also, wires 64A and 65A should be long enough to allow base 52 to be removed sufficiently from handle 50 to thereby permit replacement of the batteries in the device.

Annular battery case adapter 54 has a notched portion 67 that fits within a top portion 68 of handle 50. A typical bonding glue may be used to seal these two members together. A bonding compound may also be used to seal the battery case cap 18 to adapter 54. The battery case cap 18 is annular in shape and includes an internally threaded portion 69 which is adapted to receive an outwardly threaded portion 70 of electronics module 14. A dielectric disc 71 is positioned within an annular ridge 72 of battery case cap 56. Dielectric disc 71 includes a central copper contact 74 and a concentric outer contact 75 to which the wires 64A and 65A, respectively, connect. A rivet (not shown) may connect from each contact through disc 71 and the wires may be soldered to the rivets below disc 71.

The electronics module 14 shown in FIG. 3 includes a housing member 78 open at its bottom and top end. Module adapter 20 has an upwardly extending annular flange 79 that fits within the bottom portion 80 of member 78. The modular adapter 20 includes a downwardly extending flange 70A having threaded portion 70, and including an inner annular ridge 70B for accommodating contact mounting disc 82. The contact mounting disc 82 includes contacts 82A and 82B attached to the disc 82 by suitable means such as rivets which extend through disc 82. Contacts 82A and 82B extend below disc 82 into contact with the contacts 74 and 75, respectively, when the module 14 is threadedly engaged with battery case 12. Thus, disc 71 and disc 82 may be considered as comprising connector means. Wires are appropriately soldered to the contacts 82A and 82B above the disc 82 to provide connection to the drive circuitry contained within the electronics module 14 (see FIG. 6).

A socket mounting disc 85 is inserted from below through member 78 prior to securing adapter 20 to member 78. Disc 85 rests against an inwardly extending lip 86 of member 78. The disc 85 may be appropriately bonded in place against lip 86 by a conventional glue. A socket assembly 88 is suitably attached to disc 86 and includes a conventional screw thread socket 89 for accommodating the fluorescent light source 16. The assembly 88 includes conventional flat outer contact 90 which may be integrally connected with the threads of socket 89, and a center contact 91. Rivets are used to connect the contacts 90, 91 to disc 85, and extend through disc 85 so that solder connections may be made to the rivets below disc 85 from the drive circuitry in module 14. Contacts 90 and 91 connect to the outer and inner contacts of source 16 when source 16 is threaded into socket 89. Usually, the assembly 88 and disc 85 are assembled and then inserted in member 78 with socket 89 extending through the top portion 89A of member 78.

Housing member 78 also has a rectangular aperture 78A for accommodating slide switch 22. Switch 22 may be fastened in place by screws 22A, is a single pole single throw ON/OFF switch, and includes conventional solder terminals which have wires connected thereto from the drive circuitry of module 14.

Referring now to FIG. 4 there is shown a partial cross-sectional view of the fluorescent source 16 which includes a fluorescent tube 95 supported at its ends by annular seating members 96 and contained within a clear plastic protective tube 97. A specific configuration of one seating member 96 is shown in FIG. 5 in a perspective view. The members 96 may be resilient rubber. The top end of source 16 is covered by an end cap 99 of plastic having an aperture therein for accommodating one of the electrodes 101 of tube 95. Cap 99 snugly fits in the top end of tube 97 and may be glued in place. A spacer 109 is positioned within the bottom end of tube 97 below fluorescent tube 95. The second electrode 102 of tube 95 extends within the center aperture of spacer 109. A suitable bonding glue 109A is used to seal the spacer 109, conventional insert 104 and tube 97 as a unitary structure. Wire 101A connects to electrode 101, down along fluorescent tube 95 and to the threaded portion 104A of insert 104. Similarly, wire 102A connects between electrode 102 and contact 105. Fluorescent tube 95 may be a conventional F4T5, F6T5, F8T5, or F13T5 tube sold, for example, by Sylvania or G.E. These tubes typically have two pins at each end and in the disclosed embodiment, as shown in FIGS. 4 and 6, connection is made to only one pin or contact at each end, and the tube is operated in a conventional manner in what is termed the "instant start" mode of operation. Of course, contact 105 and threaded portion 104A are insulated from each other, and connects respectively to contacts 91 and 90 shown in FIG. 3 when the fluorescent tube is screwed into socket 89. The tube 97 shown in FIG. 4 may be provided with a reflective surface 107 extending along a portion of the tube and allowing for directivity of the light generated from the fluorescent tube 95.

Referring now to FIG. 6 there is shown a schematic diagram of the circuitry used in the device of this invention. In FIG. 6 the circuitry is separated by dotted blocks each of which correspond to separate sections of the device. The transformer T2, double pole switch 17, capacitor C4 and diode CR3 are contained within chamber 32 of base 10. The receptacle 11 may receive the AC voltage, which is fed via pole 17A of switch 17 to the primary winding of transformer T2. The receptacle 15 may receive the 12 volt DC voltage which is fed to one contact of pole 17B of switch 17 and one side of the secondary winding of transformer T2. The capacitor C4 couples across the secondary winding and also between terminal 110 and the anode of diode CR3. The cathode of diode CR3 connects to the common contact of pole 17B and also to terminal 111.

Switch 17 is shown in FIG. 6 in its OFF condition whereby no charging energy can be coupled to battery B in case 12, as poles 17A and 17B are in their open position. When switch 17 is moved to its CHARGE/ON position charging energy can be supplied to battery B. If an AC plug is inserted in receptacle 11, this AC energy is impressed across, the primary winding of transformer T2. Transformer T2 is a step down transformer thus the secondary voltage is lower than the impressed primary voltage. Diode CR3 rectifies the secondary voltage while capacitor C4 keeps the voltage across terminals 110, 111 at about 12 to 15 volts, terminal 111 being the more positive terminal. Thus, a charging current is provided via diode CR3, diode CR2 and resistor R3, for battery B. Similarly, if a DC plug is inserted in receptacle 15 with switch 17 on, the 12 volt DC voltage is applied directly across terminals 110, 111 and battery B receives a charging current.

Battery case 12 preferably includes a plurality of batteries arranged in a pack with two (positive/negative) leads coupled to a battery clip such as the one depicted in FIG. 9. The batteries are preferably 12 volt nickel cadmium rechargeable batteries. In FIG. 6 the negative terminal of battery B connects to both terminals 110 and 112. The positive terminal of battery B connects via charging resistor R3 to the cathode of diode CR2, and to the anode of diode CR1. The anode and cathode of diodes CR2 and CR1, respectively, intercouple to terminals 111, 113. Terminals 112 and 113 represent the mating contacts between case 12 and module 14. As indicated in FIGS. 3 and 9, the resistor and diodes in case 12 are contained in a holder 120 that couples between clip 66 and receptacle 58. With a smaller capacity battery pack resistor R3 is larger in value so that the battery is charged slower, than if a larger energy capacity battery pack were employed. With the smaller capacity pack resistor R3 has a value of 68 ohms while for the larger pack its value is 22 ohms.

When switch 17 is in the charge position and either an AC or DC source is plugged in, battery B is charged via resistor R3 and diode CR2. If switch 22 is also on, some of the charge current is coupled to the drive circuitry 115. When the battery B is not being recharged, diode CR1 provides a current path from battery B to dirve circuit 115; that is if switch 22 is closed.

Next, the construction and mode of operation of the drive circuitry 115 is considered. This circuitry comprises transistor Q1, transformer T1 and other components. Resistors R1 and R2 comprise a voltage divider with the connecting node between these resistors coupled to the base of transistor Q1. Terminal 112 also couples directly to the base of transistor Q1. The emiter and collector of transistor Q1 couple to the feedback winding $N_{fb}$ and primary winding $N_p$, respectively, of transformer T1. Capacitor C1 couples across resistor R1. The secondary winding $N_s$ couples in series with capacitor C2 to fluorescent tube 95, while capacitor C3 is connected across winding $N_s$.

Drive circuit 115 is a DC to AC power converter that operates on the principle that energy is stored in the secondary winding $N_s$ of transformer T1 during the "on" (conduction) time of transistor Q1, and is transferred to the load (fluorescent tube) during the "off" (non-conduction) time of transistor Q1.

With switch 22 in a closed position a positive voltage is applied via battery B and the voltage divider of resistors R1 and R2 to the base of transistor Q1, and transistor Q1 begins to conduct and is rapidly driven into saturation, wherein $V_{ce}$ of transistor Q1 is near zero volts. When transistor Q1 becomes saturated a constant voltage appears across winding $N_p$. Because of the inductance of transformer T1, the primary voltage produces a linearly rising current in primary winding $N_p$. This current, in turn, induces a constant voltage in the feedback winding $N_{fb}$ and secondary winding $N_s$. The relative polarities of the voltages across the windings of transformer T1 are determined conventionally by dot notations. The voltage induced across winding $N_s$ charges capacitor C3 but because the fluorescent source is not initially ignited at that time because the induced secondary voltage is not large enough, capacitor C2 does not charge. The voltage induced across feedback winding $N_{fb}$ produces a constant base current that determines the maximum value of the primary (collector of transistor Q1) current. The relationship between base and collector current may be expressed by the following equation:

$I_B \times h_{fe} = I_c$;

where $I_B$ = base current of transistor Q1, $h_{fe}$ = current amplification factor of transistor Q1, and $I_c$ = collector current of transistor Q1.

Since the base current is constant during the conduction cycle of transistor Q1, the linearly rising collector current reaches its maximum value in a period of time determined by the following equation:

$f = KV/\beta A_{eff} N_p$;

where $f$ = frequency of oscillation,

K = a constant of $25 \times 10^6$ when the area A is in square centimeters,

V = the applied voltage, $\beta$ = peak flux density of the transformer core material, $A_{eff}$ = effective area of the core, and $N_p$ = number of turns of primary winding.

When the collector current reaches its maximum value, it can no longer increase, induction ceases, the induced voltage drops to zero, and a regenerative action via winding $N_{fb}$ causes transistor Q1 to be driven into the cutoff region. As the current in winding $N_p$ decreases, the voltage induced in winding $N_s$ reverses and the voltage induced in winding $N_{fb}$ holds transistor Q1 off. Also, when the secondary voltage reverses, capacitor C3 discharges through the secondary winding $N_s$. This action creates a voltage across the fluorescent lamp which is great enough to ignite the lamp and discharge capacitor C2 therethrough. When the energy stored in transformer T1 has been dissipated into the fluorescent source the cycle starts over again but, because the source is not ignited, capacitor C2 charges and discharges on each succeeding half cycle. The reactance of capacitor C2, along with the inductive reactance of the winding $N_s$ and the impedance of the fluorescent source cause a sine wave of current to drive the fluorescent source. This sine wave of current creates even heating in the source and decreases the possibility of damaging the fluorescent source. Capacitor C3 continues to charge and discharge and helps to tune the secondary winding $N_s$. Capacitor C3 also may affect the frequency of oscillation of circuit 115. Capacitor C1 speeds up the switching time of transistor Q1 and increases the efficiency of circuit 115.

Typical components employed in one embodiment of the invention are listed below:

| Component | Value or Type |
|---|---|
| Transistor Q1 | 2N5440 |
| Capacitor C1 | 0.1 ufd, 25 VDC |
| Capacitor C2 | 0.002 ufd, 300 VDC |
| Capacitor C3 | 0.001 ufd, 300 VDC |
| Capacitor C4 | 200 ufd, 25 VDC |
| Resistor R1 | 150 ohms, ½ W |
| Resistor R2 | 2200 ohms ½ W |
| Resistor R3 | 68 ohms, ½ W |
| Diodes CR1, CR2, CR3 | IN 4001 |
| Transformer T1 | Ferroxcube No. 206F440-3E2A $N_p$ = 6 turns, $N_{fb}$ = 3 turns, $N_{fb}$ = 200 turns. |
| Switch 22 | single pole/single throw |
| Switch 17 | double pole/single throw |

FIG. 7 shows a clip-on reflector 122 including end clips 124 and 126 which are fastenable about tube 97 of source 16. The reflector 122 is also shown in a top view in FIG. 8, and includes arcuate reflector sections 123 and 125. Reflector 122 should be positioned with joining line 127 pointing at about the middle of fluorescent tube 95. This reflector directs the light from the fluorescent source in an opposite direction from the reflector and is designed to reflect a minimum amount of light back towards the source.

FIG. 9 shows a battery clip 66 like that shown in FIG. 3. Wire 66A extends to snap contact 67A which in turn connects to the negative terminal of the battery. Similarly, wire 66B extends via holder 120 to snap contact 67B which in turn connects to the positive terminal of the battery. Holder 120 may be a rubber sleeve that contains resistor R3 and diodes CR1 and CR2, interconnected as shown in FIG. 6. Clip 66 may be a conventional clip like those used in portable radios, for example.

Having described certain features associated with an embodiment of the present invention, other features and modifications thereof should become apparent to one skilled in the art, all of which are contemplated as falling within the scope of this invention and to be solely limited by the appended claims.

What is claimed is:

1. A battery-powered lighting device comprising:
    a case adapted to contain at least one battery, and including a connector part having at least two terminals and a pair of electrically conductive means each coupled from a terminal of the battery to one of the terminals of the connector part;
    a module connected to the case and also including a connector part having at least two terminals, which latter connector part is contactable with the connector part of the case;
    drive circuitry contained within the module and electrically coupled to the connector part of the module;
    said drive circuitry comprising a power converter for changing direct current voltage to alternating current voltage, switch means coupled to the power converter for enabling operation thereof and a pair of output connections;
    said module including an internally threaded socket;

an elongated fluorescent light source having a discharge electrode disposed at each end thereof;
    a plastic housing having an insert at one end and enclosing the fluorescent light source;
    means for supporting the light source in fixed position relative to and inside of the plastic housing;
    said insert engageable in the internally threaded socket and including means for electrically coupling the output connections of the drive circuitry to the electrodes of the source, said means for electrically coupling including a central metal electrical contact and an externally threaded metal electrical contact portion;
    and conductor means connecting from each said electrode to said central metal contact and said externally threaded metal portion, respectively.

2. A lighting device as set forth in claim 1 further comprising a base including a threaded portion, wherein the case also includes a threaded portion mateable with the threaded portion of the base.

3. A lighting device as set forth in claim 2 wherein the base includes a connector means having at least two terminals mateable with a connector means of the case having at least two terminals, wherein the base also includes a first receptacle for receiving a DC plug and electrically conductive means selectively coupled from the DC receptacle to the base connector means, and a second receptacle for receiving an AC plug and electrically conductive means selectively coupled from the AC receptacle to the base connector means.

4. A lighting device as set forth in claim 1 wherein the plastic member is tubular in shape and transparent.

5. A lighting device as set forth in claim 4 further comprising reflector means secured to the transparent plastic member.

6. A lighting device as set forth in claim 5 wherein the reflector means includes at least two arcuate reflector surfaces integrally connected.

7. A lighting device as set forth in claim 1 wherein said device is bridge-shaped.

8. A battery powered portable lighting device that may be recharged from a DC power source or from an AC power source comprising;
    a base including a threaded portion having an aperture therein for holding a connector means, an AC receptacle, a DC receptacle and a switch means;
    a step-down transformer contained within the base;

electrically conductive means selectively intercoupling the transformer, DC receptacle, AC receptacle and base connector part;
    a case adapted to contain at least one battery, and including a first connector part having at least two terminals and a pair of electrically conductive means each coupled from a terminal of the battery to one of the terminals of the first connector part;

wherein the first connector part of the case is mateable with the connector means of the base;
    an electronics module including a connector part having at least two terminals which latter connector part is contactable with a second connector part of the case;
    wherein the electronics module and the case both include threaded portions that are engageable to connect the electronics module and case;
    drive circuitry contained within the electronics module and electrically coupled to the connector part of the electronics module;
    said drive circuitry comprising a power converter for changing the DC voltage to AC voltage, switch means coupled to the power converter for enabling operation thereof, and a pair of output connections;
    said module including an internally threaded socket;

an elongated fluorescent light source having a discharge electrode disposed at each end thereof;
    a plastic housing having an insert at one end and enclosing the fluorescent light source;
    means for supporting the light source in fixed position relative to and inside of the plastic housing;
    said insert engageable in the socket and including means for electrically coupling the output connections of the drive circuitry to the electrodes of the source, said means for electrically coupling including a central metal electrical contact and an externally threaded metal electrical contact portion;
    and conductor means connecting from each said electrode to said central metal contact and said externally threaded metal portion, respectively.

9. In a battery-powered lighting device having at least a housing means for containing at least one battery, DC to AC power converter drive circuitry means and means selectively coupling the battery to the drive circuitry, the improvement comprising:

a fluorescent light source including electrodes disposed at opposite ends thereof;

a plastic tubular translucent member having an insert at one end and enclosing the light source;

means for supporting the light source in fixed position relative to and inside of the plastic member and a threaded socket means in one end of the housing;

said insert engageable in the threaded socket and having a central metal electrical contact and an externally threaded metal contact portion coupled to one end of said plastic member adjacent one end of said fluorescent light source;

and conductor means connecting from each said electrode to said central metal contact and said externally threaded metal portion, respectively.

10. A lighting device as set forth in claim 9 wherein said conductor means includes a conductor wire and said means for supporting the light source includes a pair of resilient seating members, one at each one of said light source.

11. A lighting device as set forth in claim 10 wherein said seating members are dimensionsioned to fit snugly within said plastic member.

12. A lighting device as set forth in claim 1 comprising a sealing cap disposed at the end of the plastic member opposite said insert, and a spacer disposed intermediate said insert and one of said seating members and having an aperture therethrough for accommodating the conductor wires.

* * * * *